No. 815,532. PATENTED MAR. 20, 1906.
R. C. HILLS.
BRIQUETING MACHINE.
APPLICATION FILED JUNE 20, 1905.

Witnesses
Burt L. Rhoads.
Otto E. Hoddick.

Richard C. Hills.
Inventor
Attorney

No. 815,532. PATENTED MAR. 20, 1906.
R. C. HILLS.
BRIQUETING MACHINE.
APPLICATION FILED JUNE 20, 1905.

Witnesses
Burt L. Rhoads.
Otto E. Hoddick.

Richard C. Hills.
Inventor

Attorney

No. 815,532. PATENTED MAR. 20, 1906.
R. C. HILLS.
BRIQUETING MACHINE.
APPLICATION FILED JUNE 20, 1905.

Witnesses
Burt L. Rhoads
Otto E. Hoddick

Richard C. Hills
Inventor by
Attorney

No. 815,532. PATENTED MAR. 20, 1906.
R. C. HILLS.
BRIQUETING MACHINE.
APPLICATION FILED JUNE 20, 1905.

Witnesses
Burt L. Rhoads.
Otto E. Hoddick.

Richard C. Hills.
Inventor
by
Attorney

No. 815,532. PATENTED MAR. 20, 1906.
R. C. HILLS.
BRIQUETING MACHINE.
APPLICATION FILED JUNE 20, 1905.

Witnesses
Burt L. Rhoads.
Otto E. Hoddick.

Richard C. Hills.
Inventor by
Attorney

UNITED STATES PATENT OFFICE.

RICHARD C. HILLS, OF DENVER, COLORADO.

BRIQUETING-MACHINE.

No. 815,532.　　　Specification of Letters Patent.　　Patented March 20, 1906.

Application filed June 20, 1905. Serial No. 266,128.

*To all whom it may concern:*

Be it known that I, RICHARD C. HILLS, a subject of the King of Great Britain, residing in the city and county of Denver and State of Colorado, have invented certain new and useful Improvements in Briqueting-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of multimold briquet-machines in which the rams or plungers at one extremity are horizontally operated by a reciprocating motion, while the resistance at the opposite extremity cushions upon an elastic medium so disposed as to measure and record the pressure resisted. This press is designed to handle any material intended to be pressed into blocks or briquets.

The construction embraces mechanism whereby a single hydraulic cylinder is used in connection with a number of molds all in operation at the same time and the perfection of the feeding, discharging, and adjusting mechanism insuring at all times a briquet of constant size, weight, and density.

My further object is to provide a machine of this class which shall be comparatively simple in construction, economical in cost, reliable, durable, and thoroughly practicable in operation; and to these ends the invention consists of the features, arrangements, and combinations hereinafter described and claimed, all of which will be fully understood by reference to the accompanying drawings, in which is illustrated an embodiment thereof.

In the drawings.

The same reference characters indicate the same parts in all the views.

Let the numeral 5 designate a supporting-base of cast-iron or of structural iron suitably connected and adapted to be secured to a masonry foundation. (Not shown.) Upon this base are mounted stationary cross-heads, one on each end of the machine. The cross-head at the right or forward extremity of the machine, referring to Figs. 1 to 4, inclusive, is designated by the numeral 6, while that at the left or rear extremity of the machine is designated by the numeral 7. The projecting extremities of these cross-heads are connected, as shown in the drawings, by cross-rods 8 and 9, respectively. The two cross-heads are connected with each other by strong tension-rods 10.

At the forward extremity of the machine is located an eccentric-shaft 12, whose extremities are journaled in suitable boxes 13. The shaft 12 is provided with double involute cams 15 and 15$^a$ arranged in pairs. At the opposite extremity of the machine is located a relief-shaft 20, located transversely of the machine. Upon this shaft is mounted a number of relief-heads 19, which are held in place by keys 19$^a$, engaging seats 19$^b$, larger than the keys, so that each pressure-head when actuated may operate the relief-shaft independently, and thus avoid the wear on the relief-plungers as each of the latter moves back from one to two inches when the briquet is formed.

Centrally mounted on the relief-shaft and made fast thereto by a key A' is a toothed segment A, which engages a rack B, mounted on the stem 24 of a piston 25, located in a hydraulic resistance-cylinder 26. A coil-spring 28 is interposed between the rack B and the stuffing-box 29 of the cylinder, which is secured to the cross-head 7. The cylinder 26 communicates with an upwardly-projecting chamber 30, having an air-space in its upper portion, which air-space renders the liquid, preferably oil, elastic. This chamber 30 is connected with a pressure-gage C, and the air-pressure in the chamber may be regulated by an air-pump (not shown) to give any desired pressure up to ten tons per square inch on the surface of the briquet. Arranged transversely across the machine intermediate the driving-shaft 12 and the pressure-heads is a number of mold-boxes 32, each composed of two members $32^a$ and $32^c$, mounted in the permanent mold-casing 2. The rear part $32^c$ is relatively short and stationary and is chamfered off, as shown at $32^d$, to prevent the accumulation of the material at the point of contact with the front part, which will hereinafter be termed the "movable" mold-box member. Above each of these boxes and arranged to communicate with an opening or feed-space $32^g$ in the movable mold-box member when the latter is properly manipulated is a hopper 33. The material to be briqueted is fed from this hopper at predetermined intervals into the said feed-space. Sliding rams or plungers 38 enter the movable mold-box members from the front. The forward extremity of each plunger is pivotally connected, as shown at 39, with a pitman 40, the latter being connected with a strap 41 of an eccentric 42, fast on the shaft 12. The joint 39, connecting the plunger 38 and the pitman 40, is connected to form a sort of cross-head slidably supported on a suitable track $39^a$, mounted on the framework.

Entering each mold-box from the rear and coöperating with the corresponding ram 38 is the relief-plunger 44, connected with the pressure-head 19 as aforesaid. The manner of this connection is as follows: The relief-plunger 44 is connected with a cross-head $44^a$, the latter being also connected with a threaded rod $44^c$, passing through a sleeve $44^d$, located in the bifurcated eccentric projection of the relief-head. This sleeve $44^d$ is provided on opposite sides with journals $44^e$, which engage half-bearings formed in the relief-head. The sleeve is secured in place by a plate $44^f$, bolted to the relief-head on opposite sides of the sleeve. The threaded connecting-rod $44^c$ is provided with nuts $44^g$, located at the opposite ends of the sleeve. By means of these nuts the connecting-rod $44^c$ may be shortened and lengthened at will, whereby the normal forward extension of the relief-plunger 44 may be regulated and the size of the briquet formed in the mold-box controlled as may be desired. Attention is called to the fact that the briquet when formed is partly in the stationary mold-box member $32^c$ and partly in the movable member $32^a$. Of course if the connecting-rod $44^c$ is shortened, whereby the forward extremity of the relief-plunger 44 is located farther in the rear when the ram 38 is at its rearward limit of movement, the space between the extremities of the ram of the relief-plunger will be relatively greater than when the rod $44^c$ is lengthened. It is evident from this that by adjusting the rod connecting the relief-head with the relief-plunger cross-head the size of the briquet may be regulated. Also by this expedient the density of the briquet may be regulated, since assuming that the charge used in making a briquet is the same in both cases it is evident that the larger the mold-space or that into which the completed briquet is finally contained the less will be the density, since the briquet in each case contains the same amount of material.

Each movable mold-box member $32^a$ is connected with two cross-heads 36 by two bars $36^a$, one of these bars being located on each side of the corresponding ram 38, as shown in the drawings. Each pitman 40 passes between two of the cross-heads 36. To each pair of these cross-heads are attached by means of bolts, as shown in the drawings, or in any other suitable manner, the rear extremities of four rods or bars 47, two above and two below the eccentric shaft 12. The forward extremities of these rods are supported by the cross-heads 6, the said rods sliding freely in openings formed therein. To each lower rod 47 is attached a tappet 48. These tappets are arranged to be engaged by two of the involute cams 15 of the shaft 12 for the purpose of imparting the forward movement to the movable mold-box member $32^a$, together with the rectangular frame composed of the two cross-heads 36 and the four rods or bars 47. Mounted upon the two upper rods 47 of each rectangular frame are two similar tappets 49, located rearward of the tappets 48 and arranged to be engaged by two other cams $15^a$ of the shaft 12 for the purpose of imparting the rearward movement to the mold-box member $32^a$ and its attachments. The tappets 49 are located on the outside of the upper rods 47 and the cams $15^a$ rotate in planes of these tappets. (See Fig. 1.) The tappets 48 are located on the inside of the lower rods 47 and the cams 15 rotate in the planes of these last-named tappets.

Figures 11, 12:
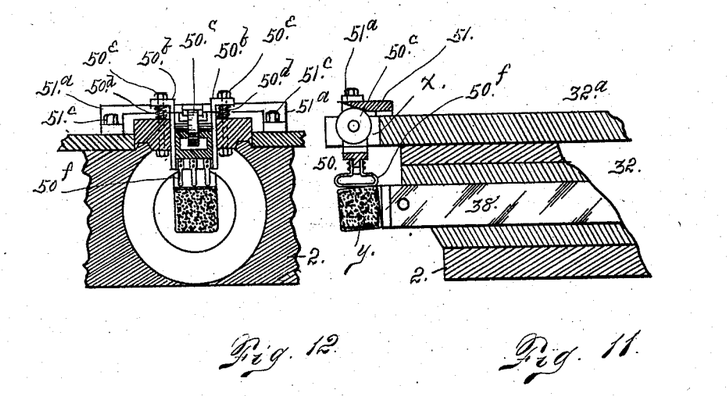
Fig. 11 is a fragmentary view showing the mold-box and ram or plunger with the feed mechanism removed.
Fig. 12 is an end view of Fig. 11 looking toward the right.

Located in the recess X, formed in the rear extremity of the upper portion of the movable mold-box member, is an extractor device 50, consisting of a body part $50^a$, two angle-plates $50^b$, a roller $50^c$, and a depending member $50^f$, adapted to directly engage a briquet for extracting purposes. This extractor is connected with the upper plate of the movable mold-box member by bolts 50ᵉ. Coil-springs 50ᵈ are interposed between the tops of the angle-plates 50ᵇ and the top of the mold-box. When the movable mold-box member is at its forward limit of movement, the roller 50ᶜ of the extractor device engages the beveled face 51ᵃ of a transversely-disposed piece 51, whose extremities are secured to the mold-case by bolts 51ᶜ. (See Fig. 12.)

Figure 1:
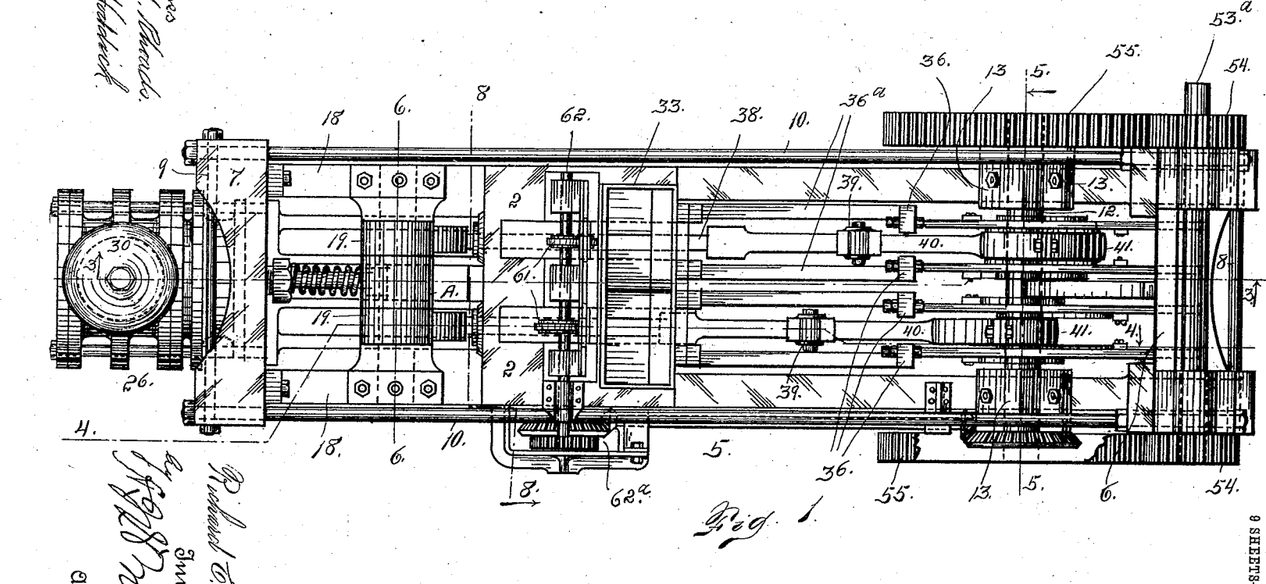
Figure 1 is a top or plan view of my improved machine.
Figure 2:
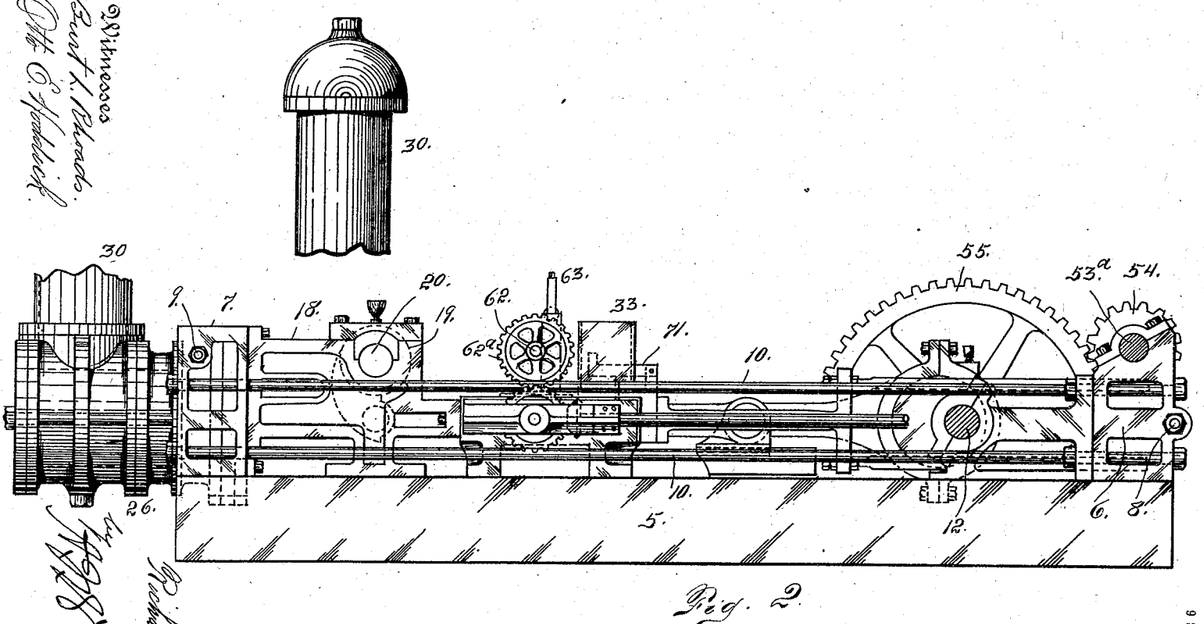
Fig. 2 is a side elevation of the same, showing the shafts at the forward end of the machine sectionized.
Figure 3:
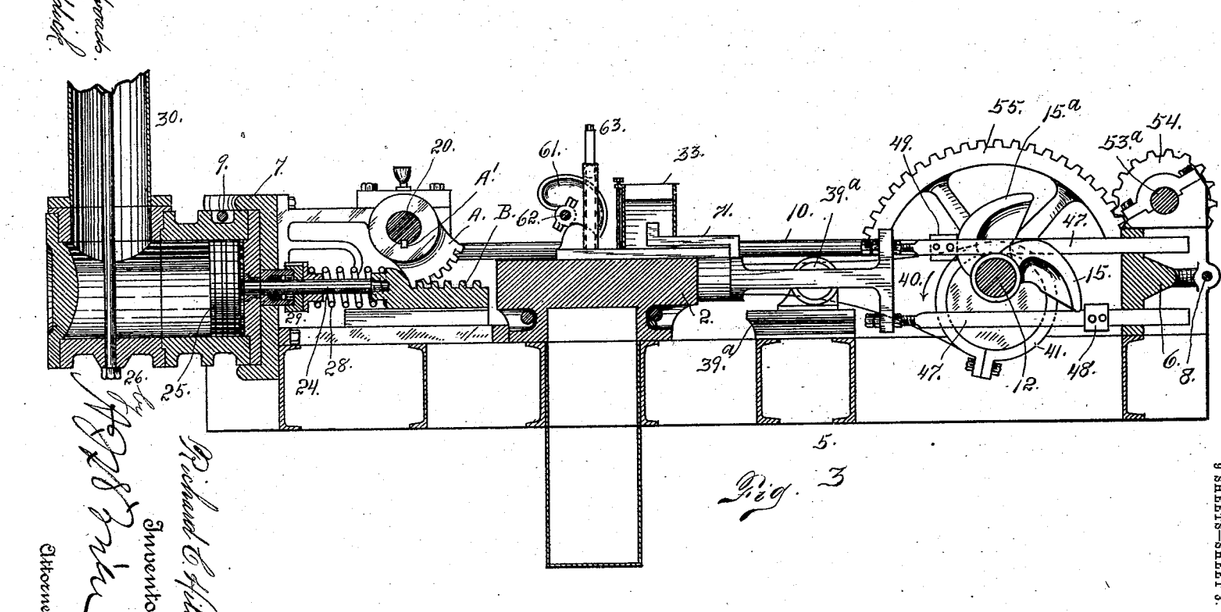
Fig. 3 is a section taken on the line 3 3, Fig. 1.
Figure 4:
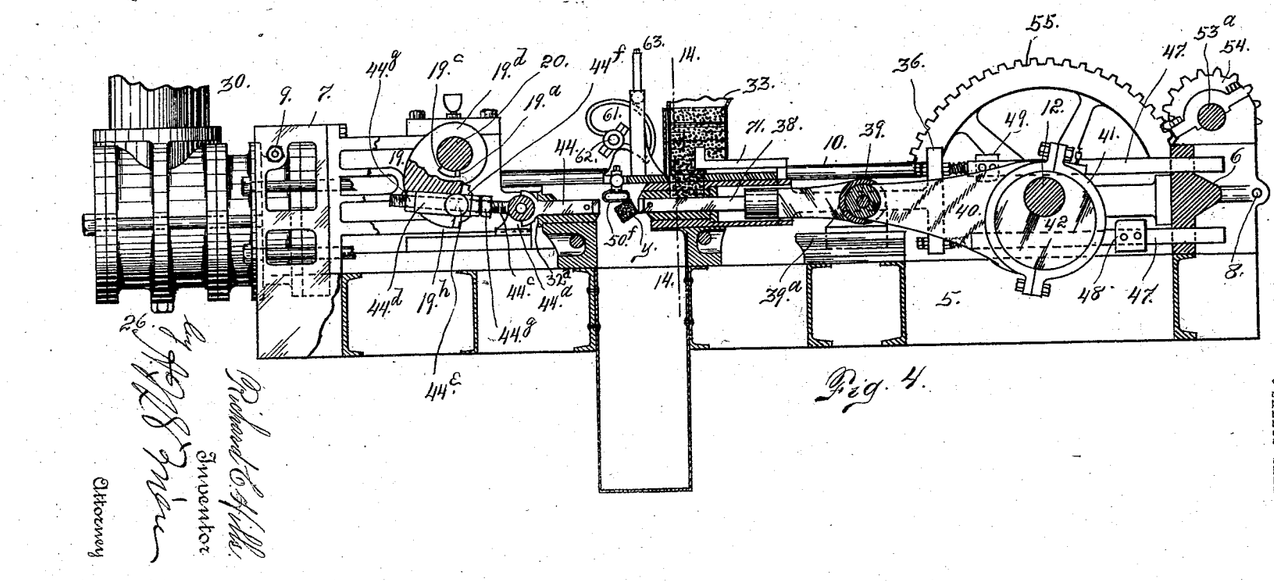
Fig. 4 is a section taken on the line 4 4, Fig. 1.
Figure 5:
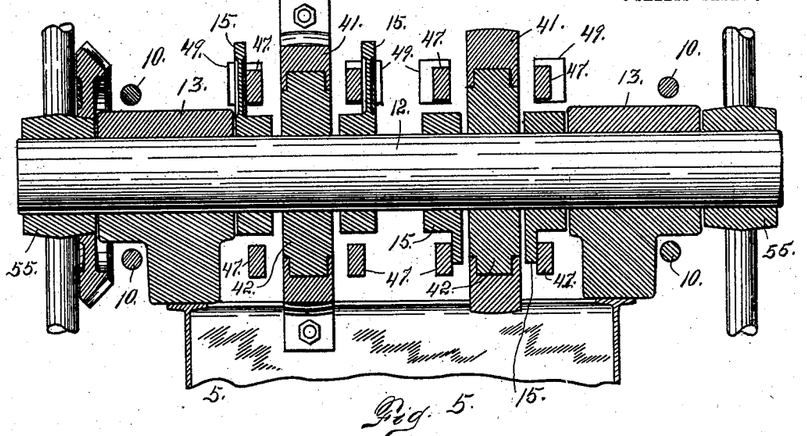
Figs. 5 and 6 are cross-sections taken on the lines 5 5 and 6 6, respectively, of Fig. 1, the parts being shown on a larger scale.
Figure 6:
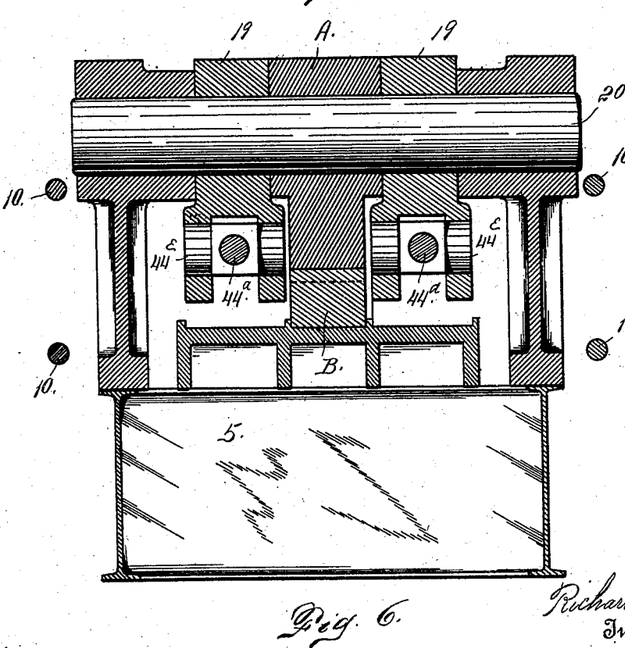
Figure 7:
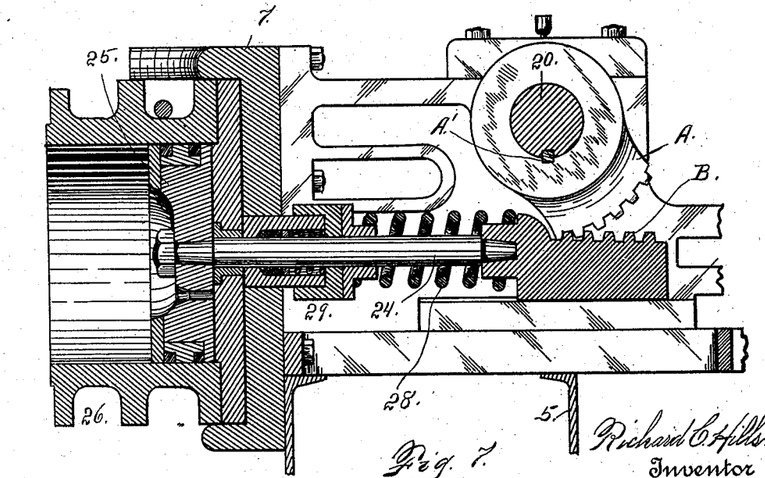
Fig. 7 is a central vertical longitudinal section taken through the rear part of the machine, the forward portion of the structure being broken away and the parts shown on a larger scale than in Figs. 1 to 4, inclusive.
Figure 8:
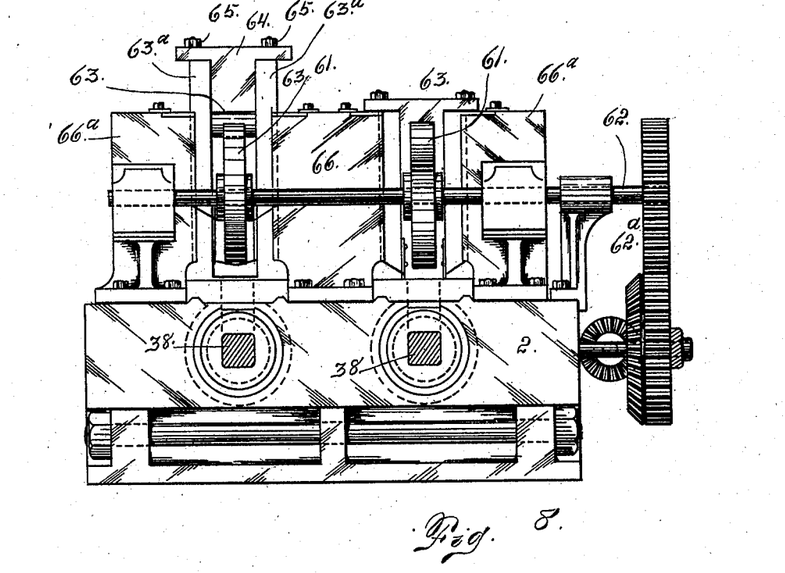
Fig. 8 is a section taken on the line 8 8 of Fig. 1 viewed in the direction of the arrow.
Figure 9:
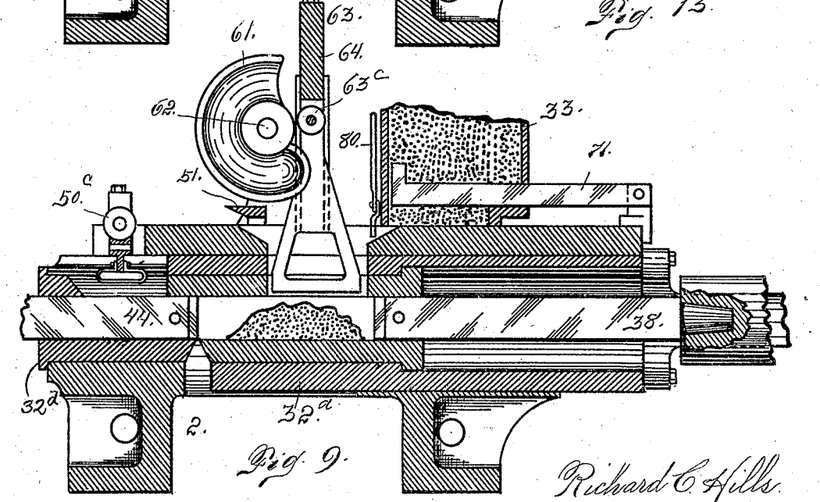
Figs. 9 and 10 are central vertical sections taken through the mold-box and the adjacent portions of the apparatus, showing the parts in different relative positions.

To the stationary mold-case 2 in the rear of the hopper are attached an upright plate 66 and two similar plates 66ᵃ, located on opposite sides of the central plate 66. Vertically slidable in grooves formed in these upright plates are two feeders or feeding devices 63, each composed of two upright parts 63ᵃ, and a weight 64, connected with the upright parts by bolts 65. The lower part of each device 63 or the feeder device proper is adapted to enter the feed-space 32ᵍ of the movable box member when the latter is at its rearward limit of movement. The gravity of the feeder due to the weight 64 when unobstructed will be sufficient to cause it to move downwardly in the feed-opening 32ᵍ of the movable mold-box member and cause a charge of material therein to enter the hollow space of the mold-box. (See Fig. 9.) Each feeder is raised from the position shown in Fig. 9 through the instrumentality of a cam 61, mounted on a shaft 62, journaled in suitable bearings supported in the mold-case. Each cam 61 acts on a roller 63ᶜ of the feeder and lifts the same to the position shown in Fig. 13, whereby the movable mold-box member is allowed to move forwardly in order to receive another charge of material from the hopper. The cams 61 are so constructed that the feeder is held in the elevated position a sufficient period of time to allow the mold-box to move forwardly, receive a charge of material, and return to its rearward limit of movement. (Shown in Fig. 9.) Then the feeder will be released and carried downwardly by its weight to perform the feeding function. The lower part of this feeder is hollow, forming a sort of shell which really cuts the material or loosens it from the walls of the feed-opening 32ᵍ of the movable mold-box member, whereby the briquet material is allowed to drop downwardly into the briquet-space of the mold-box between the extremities of the ram and the relief-plunger. As this material reaches a position in front of the approaching ram 38 the latter immediately follows, engages the said material, (see Fig. 2,) and continues its movement to the position shown in Fig. 10, when the briquet is formed, the ram 38 and the relief-plunger 44 coöperating to produce this result, the relief-plunger being forced back into the stationary mold-box member a distance depending upon the amount of the charge and the length of the desired briquet. Accordingly the briquet is formed partly in the movable and partly in the stationary member of the mold-box.

In order to keep the briquet material Y sufficiently agitated in the hopper to cause it to flow freely into the feed-space 32ᵍ when the movable mold-box member is in the proper position, I employ an agitating or stirring-arm 71, which is connected with the top plate of the movable mold-box member and moves back and forth therewith. When the movable mold-box member is at its forward limit of movement, the rear extremity of this arm is in the forward position, whereby it presents no obstruction to the passage of material from the hopper into the feed-opening of the movable mold-box member.

From the description of the construction and relative arrangement of the parts for actuating the ram and the movable mold-box member, as heretofore described, it will be understood that the movable mold-box member which is actuated during its rearward travel by cams 15ᵃ on the shaft 12 will move rearwardly faster than the ram, which being actuated by the eccentric on the shaft 12 has a comparatively slow movement.

As each briquet is molded the shaft 20 will be actuated by the relief-plunger, and the segment A on the said shaft coöperating with the rack B on the piston-stem 24 moves the piston 25 in the resistance-cylinder 26 and prevents breakage or injury to the mechanism. The key 19ᵃ, which fastens each relief-head 19 to the shaft 20, is fast on the shaft and engages the key-seat 19ᶜ, which is considerably larger than the key, thus permitting the shaft to be actuated by each relief-head and its plunger independently while the other plungers remain stationary as each briquet is formed, each idle relief-head being retained in place by its own weight.

Figure 10:
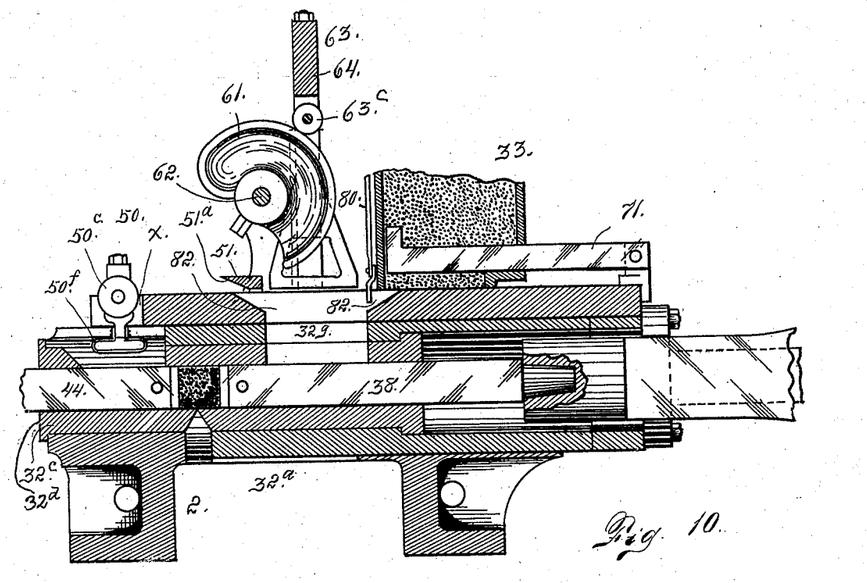
Figure 13:
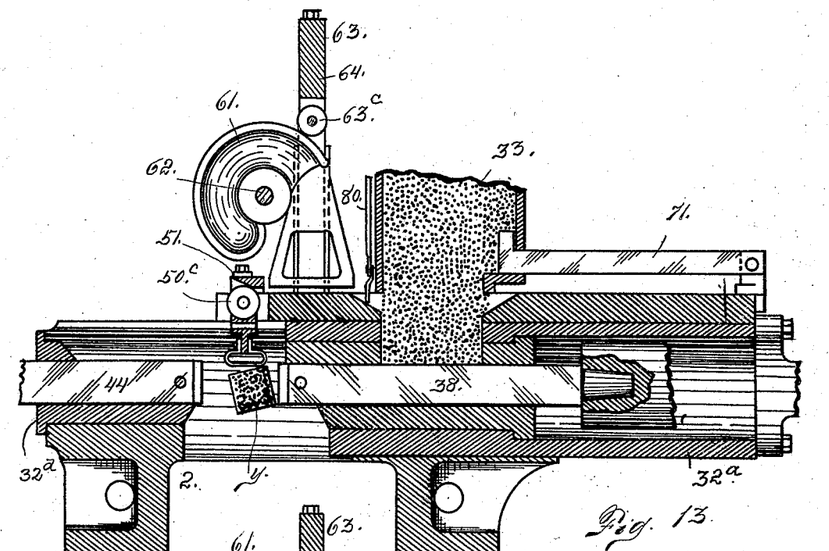
Fig. 13 is a view similar to Figs. 9 and 10, but with the parts in different positions.
Figure 14:
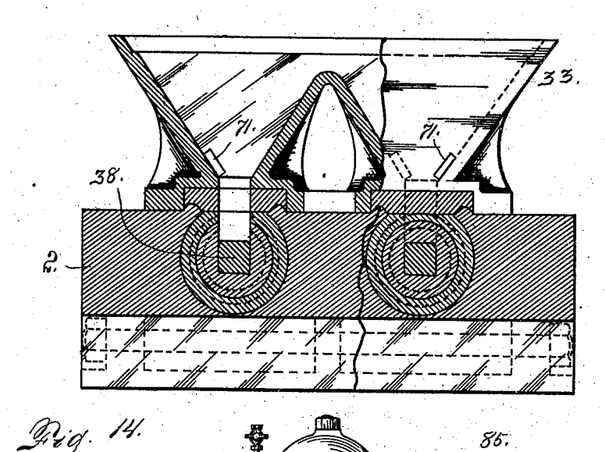
Fig. 14 is a transverse section taken through the hopper.
Figures 15, 17:
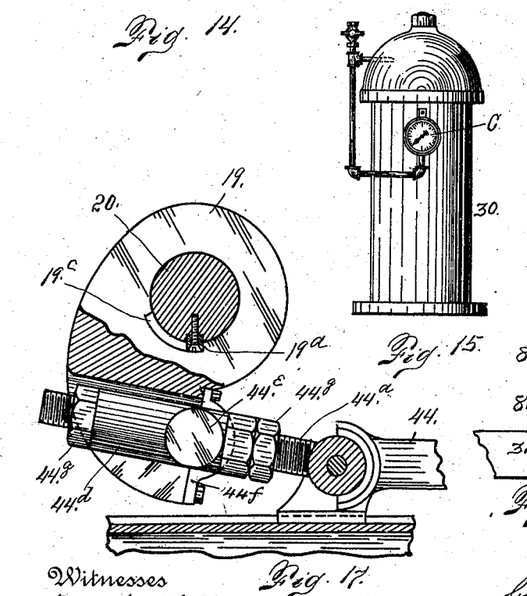
Fig. 15 is a detail view of the air-chamber connected with the relief-cylinder.
Fig. 17 is a detail view illustrating one of the relief-heads and showing its adjustable connection with the relief-plunger.
Figure 16:
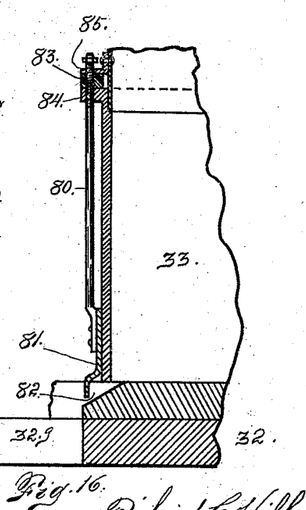
Fig. 16 is a detail view of the hopper, showing the adjustable plate for gaging and leveling the charge of material in the feed-space of the movable mold-box member.

Assuming that the parts are in the position shown in Fig. 10 and that the briquet is formed in the mold-box, the ram and movable mold-box member will begin the return or forward movement, the one by its eccentric on the shaft 12 and the other by the operation of the cams 15. Meanwhile as the ram and movable member retreat the relief-plunger in returning to its normal position pushes the briquet forward toward the discharge-opening. A slight forward movement of the ram loosens it from the briquet, and the more rapidly traveling mold-box member brings its extractor 50 (see Fig. 11) into contact with the briquet from above and forces the latter out of the mold-box and downwardly, as shown in Fig. 13. The parts will then be in the proper relative position for the formation of another briquet, and the operation just described will be repeated.

The stationary mold-case 2, to which reference heretofore has been made, extends transversely across the machine and is bolted to the framework 5. The movable mold-box members glide freely in this mold-case, and the hoppers are securely bolted thereto.

The cam-shaft 62 for controlling the feeders is actuated by a train of gears 62$^a$, to which power may be transmitted from any suitable source, preferably by connection with similar gears on the shaft 12.

As the movable mold-box member moves rearwardly, carrying a charge of briquet material from the hopper, it is essential that some means be employed for gaging the charge or leveling it at the top in order that the depth of material in the feed-space of the movable member may be uniform. In order to accomplish this, I connect a rod 80 with the rear side of the hopper and attach a gage-plate 81 to its lower extremity, the said gage-plate projecting into the outwardly-flared portion of the feed-space on one side. This outwardly-flared part of the feed-space is formed by beveling the top plate on the movable mold-box member on both sides of the feed-space proper, as shown at 82. In order that the rod 80, together with the gage-plate, may be vertically movable, a nut 83 is placed between two stationary parts 84 and 85. Now as this nut 83 is turned in any suitable manner the rod and gage-plate may be moved upwardly and downwardly at will, as will be readily understood.

In the operation of the machine power is transmitted to the driving-shaft 12 from any suitable motor through the instrumentality of suitable gearing. (Shown in Figs. 1, 2, 3, and 4.) As shown in the drawings, pinions 54 mesh with gears 55, fast on the shaft 12. The driving-pulley (not shown) is mounted on the pinion-shaft 53$^a$.

Having thus described my invention, what I claim is—

1. In a briqueting-machine, the combination of a mold-box composed of a movable member and a stationary coöperating member, a reciprocating ram entering the movable member, and a yieldingly-supported relief-plunger entering the stationary member and coöperating with the ram, substantially as described.

2. The combination of a mold-box, comprising a movable member and a coöperating stationary member, a ram entering the movable member, a relief-plunger entering the stationary member, and means for imparting reciprocating motion to the ram and the movable mold-box member.

3. In a machine of the class described, the combination with a suitable case, of a mold-box provided with a movable mold member arranged to slide in the case, a plunger arranged to enter the mold from the front, and means for operating the plunger and the movable mold-box member, the arrangement being such that the movement of the mold-box member is uniformly more rapid than that of the plunger.

4. In a machine of the class described, the combination with a suitable frame having a case, a mold having a member movable in the case, a plunger arranged to enter the mold from the front, a shaft provided with an eccentric with which the plunger is connected in operative relation, a frame connected with the movable mold-box member and provided with front and rear tappets, cams mounted on the eccentric-shaft and arranged to engage the front and rear tappets respectively, for imparting a relatively rapid reciprocating movement to the movable mold member, and a relief-plunger entering the mold from the rear, substantially as described.

5. In a multiple-mold briquet-machine, the combination with a suitable frame, of a mold-case extending transversely across the machine, of molds provided with movable mold members slidable in said case, driving-plungers entering the mold from the front, a shaft provided with eccentrics with which the driving-plungers are connected in operative relation, frames provided with front and rear tappets, said frames being connected with the movable mold-box members, and cams mounted on the eccentric-shaft and adapted to respectively engage the front and rear tappets for imparting a reciprocating movement to the movable mold-box members.

6. The combination with a suitable frame having a mold-case extending transversely thereacross, molds having members slidable in said case, said molds being open at the front and rear, resistance-plungers entering said molds from the rear and having a limited movement as described, driving-plungers entering said molds from the front, a shaft having eccentrics with which the driving-plungers are connected, frames connected with the movable mold-box members and provided with front and rear tappets, and two sets of cams mounted on the eccentric shaft, one set acting on the front tappets to impart movement to the movable mold-box member in one direction, and the other set acting on the rear tappets to impart movement in the opposite direction.

7. The combination with a suitable frame, and a mold-case extending transversely across the same intermediate its extremities, of molds mounted in the mold-case, each mold having a member slidable in said case, the said molds being open at the front and rear, driving-plungers arranged to enter the molds from the front, resistance-plungers entering the molds from the rear, a hydraulic resistance-cylinder, and a piston therein suitably connected with all of the resistance-plungers for the purpose set forth.

8. The combination with a suitable frame and a mold-case extending transversely across the same intermediate its extremities, of molds mounted in the mold-case each mold having a member slidable in said case, the said molds being open at the front and rear, driving-plungers arranged to enter the molds from the front, a shaft having eccentrics with which the driving-plungers are connected, resistance-plungers entering the molds from the rear, relief-heads with which the resistance-plungers are connected, a hydraulic resistance-cylinder, a piston therein, and an operative connection between the cylinder-piston and the relief-heads, whereby the latter act on the piston successively, and means operated from the eccentric shaft for actuating the movable mold-box members, substantially as described.

9. In a briqueting-machine, the combination with a suitable frame and a mold-case mounted thereon, of molds open at both ends and provided with movable mold members, driving-plungers entering said molds in front, resistance-plungers entering said molds from the rear, a shaft journaled in the frame, relief-heads mounted on said shaft, each relief-head being connected with the shaft to actuate the latter independently and without moving the other heads, the resistance-plungers being connected with the relief-heads, a hydraulic resistance-cylinder, a piston therein, a rack mounted on the piston-stem, and a cogged segment fast on the relief-shaft and engaging the rack of the piston-stem.

10. The combination with a suitable frame and a stationary mold-case, of molds located in said case, each mold having a movable member, driving-plungers entering the molds from the front, a driving-shaft, connections between said shaft and the driving-plungers and movable mold members, whereby the said plungers and mold members are reciprocated, the movement of the mold members being more rapid than the movement of the plungers, resistance-plungers entering the molds from the rear, relief-heads connected with said plungers, a relief-shaft upon which said heads are mounted, a hydraulic cylinder, a piston therein, and a suitable connection between the piston and the relief-head shaft.

11. The combination with a stationary mold-case, of molds located therein, each mold having a movable member, driving-plungers entering the molds from the front, a driving-shaft, connections between said shaft and the driving-plungers and movable mold members, whereby the said plungers and mold members are reciprocated, the movement of the mold members being uniformly more rapid than the movement of the plungers.

12. The combination with a mold-case, of molds supported by said case each mold having one movable member, driving-plungers entering the molds from the front, a driving-shaft, connections between said shafts and the driving-plungers and movable mold members whereby the said plungers and mold members are reciprocated, resistance-plungers entering the molds from the rear, relief-heads respectively connected with said plungers, a relief-shaft upon which said heads are mounted, a hydraulic cylinder, a piston therein, and a suitable operative connection between the piston and the relief-shaft.

13. The combination with a frame and a mold-case, of mold-boxes located in said case, each box having a member slidable in the case, driving-plungers entering the mold-boxes from the front, means for reciprocating the driving-plungers and movable mold-box members, relief-plungers entering the mold-boxes from the rear, relief-heads respectively engaging the relief-plungers and relief-shaft upon which said heads are mounted, a hydraulic cylinder, a piston therein, and a suitable operative connection between the relief-shaft and said piston, substantially as described.

14. In a briquet-machine, the combination with a suitable frame, of a mold mounted on the frame open at the front and rear and having a movable member, a driving-plunger arranged to enter the mold at one extremity, a resistance-plunger arranged to enter the mold at the opposite extremity, a briquet-extractor mounted on the movable mold member, the latter being provided with an opening through which the extractor projects downwardly, whereby as the movable mold member moves forwardly, the extractor is brought into contact with the briquet to release and eject the same, substantially as described.

15. The combination with a suitable frame, of a mold mounted on the frame and open at the front and rear, said mold having a movable member, a driving-plunger arranged to enter the mold at one extremity, a resistance-plunger arranged to enter the mold at the opposite extremity, an extractor device mounted on the rear extremity of the movable mold member, the latter having an opening through which the extractor projects downwardly to engagement with the briquet to be extracted as the movable mold member moves forwardly, the extractor device being provided with a roller, and a stationary actuating device mounted on the frame and adapted to engage the roller of the extractor device whereby the latter is moved downwardly at the point where the briquet is to be discharged.

16. In a briquet-machine, the combination with a suitable frame, of a mold mounted on the frame and open at the front and rear, said mold having a movable mold member, a driving-plunger arranged to enter the mold at one extremity, a resistance-plunger arranged to enter the mold at the opposite extremity, a spring-supported extractor device mounted on the rear extremity of the movable mold member, a stationary bar mounted on the frame, an antifrictional roller mounted on the extractor device and adapted to engage said bar which is provided with an inclined face, whereby as the movable mold member moves forwardly, the roller of the extractor device engages said inclined face, which forces the extractor device downwardly to eject the briquet, substantially as described.

17. In a briquet-machine, the combination with a mold-case, of a mold having a member slidable in said case, a driving-plunger entering the mold from the front, a hopper mounted on the mold-case and communicating with the feed-space with which the movable mold member is provided when the latter is properly adjusted, and a stirring device mounted on the slidable mold member, and entering the hopper, the said stirring device moving with the slidable mold member, for the purpose set forth.

18. The combination with a stationary mold-case, a mold-box located in said case and having a movable mold member, a driving-plunger engaging said mold-box from the front, a coöperating resistance-plunger engaging the mold-box from the rear, the movable mold member having a feed-space communicating with the chamber of the mold-box, a vertically-movable feed-plunger mounted on the frame, and suitable means for actuating the same whereby as the feed-space of said movable member reaches the proper position, the said plunger descends and causes the briquet material to enter the mold-box chamber in front of the plunger.

19. The combination with a suitable frame and mold-case, of a mold-box located in said case and having a movable mold member, means for reciprocating said member, the movable mold member having a feed-space, a hopper mounted on the mold-case and arranged to discharge into the feed-space of the movable mold member when the latter is in the proper position, a horizontally-reciprocating driving-plunger entering the mold-box from the front, a relief-plunger entering the mold-box from the rear, a vertically-movable feed-plunger adapted to enter the feed-space of the vertically-movable mold member when the latter is in the proper position, said feed-plunger being provided with an antifrictional roller, suitable guides for the feed-plunger, a cam mounted on the frame, and means for actuating the cam whereby the feed-plunger engages the roller and raises the plunger at predetermined intervals, substantially as described.

20. In a briquet-machine, the combination with a suitable frame, of a movable mold-box member provided with a feed-space, a hopper for supplying material to said space, means for reciprocating the movable mold-box member, and a vertically-adjustable gage-plate suitably mounted on the frame and projecting into the feed-space of the movable mold-box member for the purpose set forth.

In testimony whereof I affix my signature in presence of two witnesses.

RICHARD C. HILLS.

Witnesses:
A. J. O'BRIEN,
DENA NELSON.